United States Patent
Andersen et al.

(10) Patent No.: US 9,519,623 B2
(45) Date of Patent: Dec. 13, 2016

(54) METHOD AND APPARATUS FOR PRESENTING AND NAVIGATING BOOKMARKS IN A SET OF ELECTRONIC READING MATERIAL

(71) Applicant: Apollo Group, Inc., Phoenix, AZ (US)

(72) Inventors: Johnathan Andersen, Oakland, CA (US); Uri Leshno, San Francisco, CA (US); Holger Buerger, San Francisco, CA (US)

(73) Assignee: Apollo Education Group, Inc., Phoenix, AZ (US)

( * ) Notice: Subject to any disclaimer, the term of this patent is extended or adjusted under 35 U.S.C. 154(b) by 352 days.

(21) Appl. No.: 14/068,986

(22) Filed: Oct. 31, 2013

(65) Prior Publication Data
US 2015/0121212 A1 Apr. 30, 2015

(51) Int. Cl.
*G06F 17/00* (2006.01)
*G06F 17/21* (2006.01)
*G06F 17/30* (2006.01)

(52) U.S. Cl.
CPC ....... *G06F 17/211* (2013.01); *G06F 17/30884* (2013.01)

(58) Field of Classification Search
CPC .................. G06F 17/30884; G06F 17/211
USPC ................................................ 715/205, 206
See application file for complete search history.

(56) References Cited

U.S. PATENT DOCUMENTS

| | | | | |
|---|---|---|---|---|
| 5,524,201 A * | 6/1996 | Shwarts | ............ | G06F 17/30017 707/E17.009 |
| 6,144,380 A * | 11/2000 | Shwarts | ................ | G06F 3/0483 345/179 |
| 6,184,886 B1 * | 2/2001 | Bates | ................ | G06F 17/30884 707/E17.114 |
| 6,243,071 B1 * | 6/2001 | Shwarts | ................ | G06F 3/0483 715/776 |

(Continued)

OTHER PUBLICATIONS

Wightman et al., TouchMark: Flexible Document Navigation and Bookmarking Techniques for E-Book Readers, ACM 2010, pp. 241-244.*

(Continued)

*Primary Examiner* — Cong-Lac Huynh
(74) *Attorney, Agent, or Firm* — Hickman Palermo Becker Bingham LLP

(57) ABSTRACT

An improved mechanism is provided for presenting and navigating bookmarks in a set of electronic reading material (ERM). In one implementation, when a portion of an ERM is displayed, a graphical element, which represents the contents of the ERM, is also displayed. A current location indicator and one or more bookmark indicators are further displayed on or within proximity of the graphical element to show where, within the ERM, the currently displayed portion is located and where bookmarks are located. This provides a useful graphical overview to a user. In addition, the mechanism may facilitate navigation to a bookmark by enabling a user to select one of the bookmark indicators to navigate directly to that bookmark. The mechanism may also enable a user to navigate sequentially from bookmark to bookmark using a previous bookmark control and/or a next bookmark control. With these capabilities, bookmark presentation and navigation are improved.

26 Claims, 5 Drawing Sheets

(56) References Cited

U.S. PATENT DOCUMENTS

| | | | | |
|---|---|---|---|---|
| 6,535,912 B1* | 3/2003 | Anupam | G06F 17/30884 | 707/E17.114 |
| 7,286,747 B1* | 10/2007 | Lewis | G11B 27/105 | 348/E5.104 |
| 8,650,509 B2* | 2/2014 | Kangas | G06F 3/0483 | 715/206 |
| 8,990,220 B2* | 3/2015 | Wu | G06F 17/3033 | 707/741 |
| 9,223,475 B1* | 12/2015 | Kim | G06F 3/0483 | |
| 2003/0001907 A1* | 1/2003 | Bergsten | G06F 3/0482 | 715/853 |
| 2003/0080986 A1* | 5/2003 | Baird | G06F 17/30884 | 715/700 |
| 2004/0268253 A1* | 12/2004 | DeMello | G06F 17/241 | 715/230 |
| 2005/0210145 A1* | 9/2005 | Kim | G06F 17/30849 | 709/231 |
| 2007/0118794 A1* | 5/2007 | Hollander | G06F 17/241 | 715/205 |
| 2009/0189749 A1* | 7/2009 | Salada | G06F 1/1616 | 340/407.2 |
| 2009/0254823 A1* | 10/2009 | Barrett | H04N 21/235 | 715/716 |
| 2010/0005381 A1* | 1/2010 | Safars | G06F 17/30899 | 715/205 |
| 2011/0145696 A1* | 6/2011 | Chiang | G06F 17/30905 | 715/234 |
| 2011/0209039 A1* | 8/2011 | Hinckley | G06F 3/04883 | 715/206 |
| 2011/0289394 A1* | 11/2011 | Roh | G06F 17/30884 | 715/205 |
| 2012/0117451 A1* | 5/2012 | You | G06F 17/30899 | 715/205 |
| 2013/0117703 A1* | 5/2013 | Jang | G06F 3/04883 | 715/776 |
| 2013/0311867 A1* | 11/2013 | Patterson | G06F 17/2235 | 715/230 |
| 2014/0033128 A1* | 1/2014 | Patterson | G06F 17/2235 | 715/834 |
| 2014/0219630 A1* | 8/2014 | Minder | G11B 27/005 | 386/241 |
| 2014/0229811 A1* | 8/2014 | Dynin | G06F 17/30884 | 715/205 |
| 2014/0245152 A1* | 8/2014 | Carter | G11B 27/28 | 715/720 |
| 2014/0250355 A1* | 9/2014 | Jimison | G06F 3/0483 | 715/202 |
| 2014/0280180 A1* | 9/2014 | Edecker | G06F 17/30598 | 707/740 |
| 2015/0378535 A1* | 12/2015 | Habib | G06F 1/1616 | 715/776 |
| 2016/0124702 A1* | 5/2016 | Edgecomb | G06F 3/03545 | 345/179 |

OTHER PUBLICATIONS

Li et al., Construction of Cognitive Maps to Improve E-book Reading and Navigation, Elsevier 2013, pp. 32-39.*

Chen et al., Navigation Techniques for Dual-Display E-Book Readers, ACM 2008, pp. 1779-1788.*

Lee, What Goes around Comes around: An Analysis of del.icio.us as Social Space, ACM 2006, pp. 191-194.*

Kim et al., Development of Digital Textbook Standard Format based on XML, Springer 2010, pp. 363-377.*

* cited by examiner

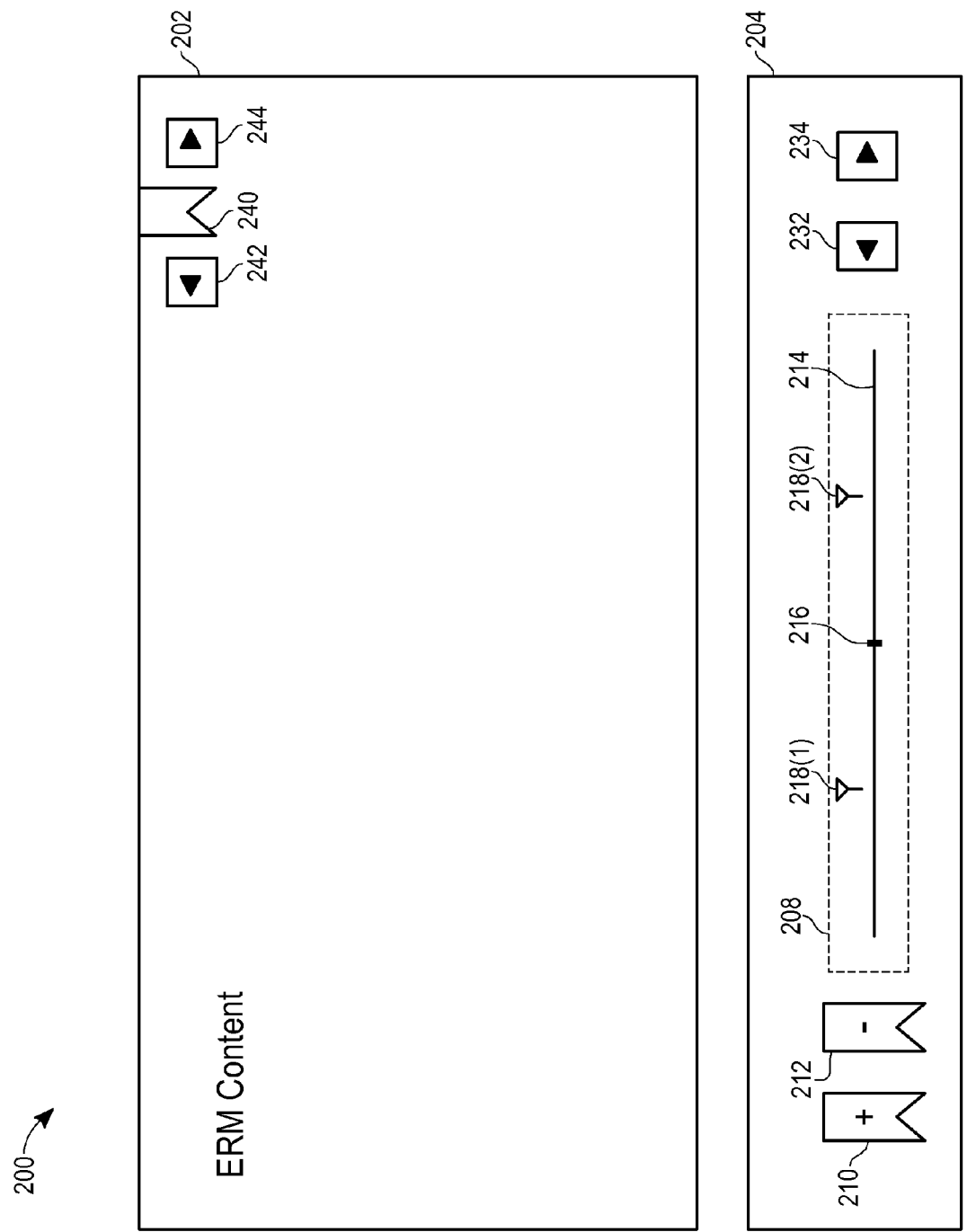

METHOD AND APPARATUS FOR PRESENTING AND NAVIGATING BOOKMARKS IN A SET OF ELECTRONIC READING MATERIAL

FIELD OF THE INVENTION

The present invention relates generally to electronic reading materials, and more particularly to a method and apparatus for presenting and navigating bookmarks in a set of electronic reading material.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In recent years, many existing sets of reading materials (e.g. books, magazines, articles, etc.) have been digitized and converted into electronic reading materials, and many new sets of reading materials have been made available in electronic form. Once in electronic form, these reading materials may be rendered to a user using a variety of rendering devices, such as desktop or laptop computers, notebook computers, tablet computers, smartphones, electronic reading devices (often referred to as eReaders), etc. A rendering device is typically capable of storing a large number of sets of electronic reading materials. As a result, a user can have access to a voluminous amount of reading materials without having to carry around a large number of physical books, magazines, papers, etc.

While having a large amount of reading materials easily available is advantageous, some users still enjoy various aspects of reading a physical set of reading material. Thus, to enhance reading enjoyment, some rendering devices provide functionalities that emulate the experience of reading a physical set of reading material. For example, some rendering devices with touch sensitive screens allow a user to go to a previous page or a next page by "swiping" a finger in one direction or the other across the screen to emulate the act of physically turning a page. Also, some rendering devices allow a user to place one or more electronic bookmarks in a set of reading material to emulate the act of placing a physical bookmark in a physical book. With bookmarking, a rendering device allows a user to designate or mark a particular portion of a set of reading material, just as a user would place a physical bookmark within the pages of a physical book. Once a bookmark is placed, the rendering device can use the bookmark, just as a user would use a physical bookmark, to quickly return to a particular portion of the reading material.

While some rendering devices may provide bookmarking capability, the manner in which this capability is implemented leaves much to be desired. For example, navigating from bookmark to bookmark is often not very convenient. Also, the display of bookmark information often obscures the content of the reading material so that the content and the bookmark information cannot be clearly viewed simultaneously. In addition, unlike with physical bookmarks where a user can look at the side of a book and see where various bookmarks are located within the book, the bookmark information provided by a rendering device usually is not presented in a manner that makes it easy for a user to determine where various bookmarks are located within the set of reading material relative to each other and relative to the overall content of the reading material. Because of these and other shortcomings, an improved bookmark presentation and navigation mechanism is needed for rendering devices.

BRIEF DESCRIPTION OF THE DRAWINGS

FIG. 2 shows a sample display rendered by a rending device, in accordance with one embodiment of the present invention.

DETAILED DESCRIPTION OF EMBODIMENT(S)

Overview

Figure 1:
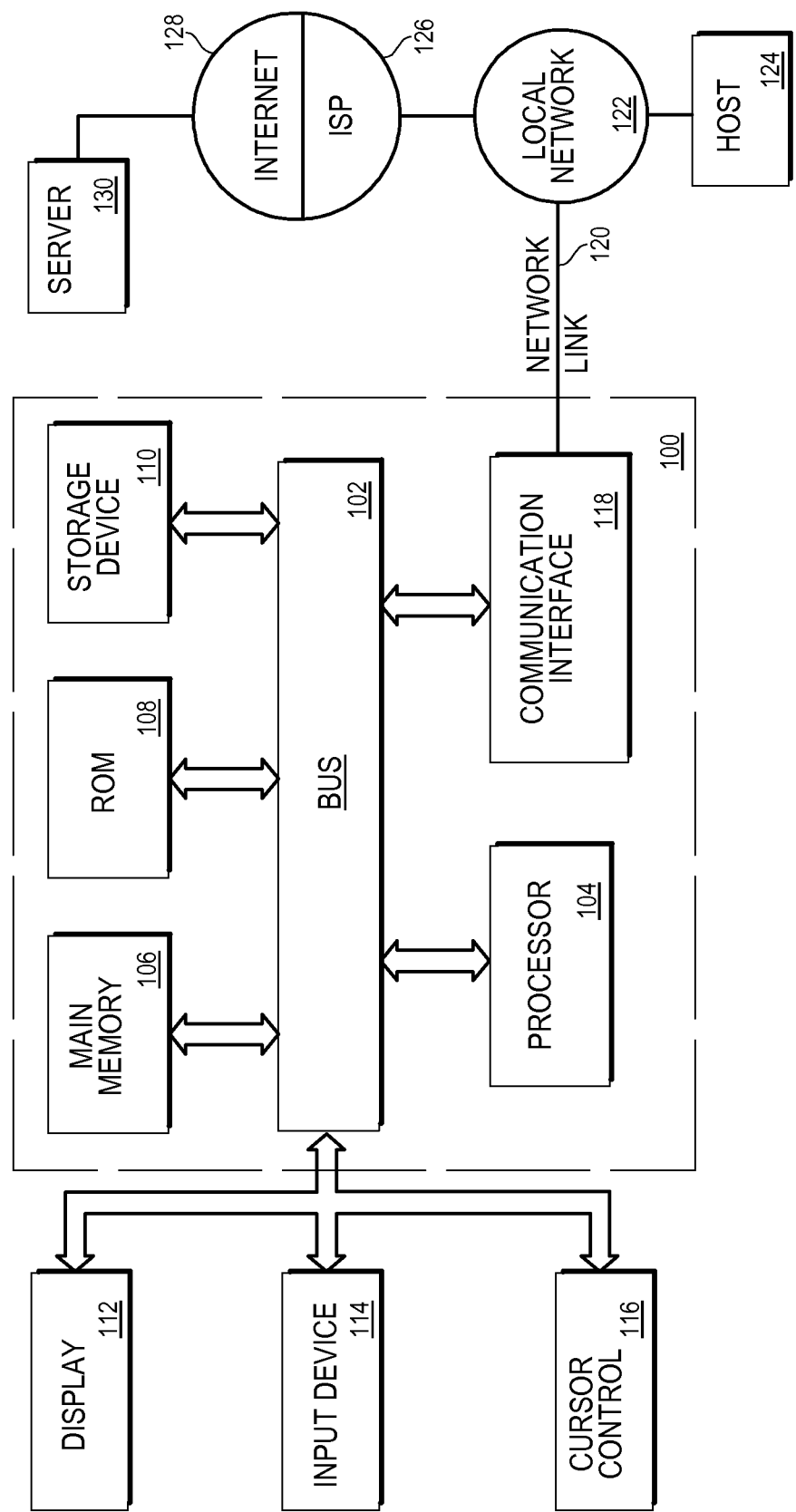
FIG. 1 is a block diagram of a sample computing device that may be used to implement a rendering device, in accordance with one embodiment of the present invention.

In accordance with one embodiment of the present invention, an improved method and apparatus are provided for presenting and navigating bookmarks within a set of electronic reading material. As used herein, the term electronic reading material (ERM) refers broadly to any type of reading material (e.g. book, magazine, newspaper, article, paper, document, etc.) that is in electronic form and that can be rendered by a rendering device. An ERM may mainly contain readable text, but may also include tables, graphs, images, and other types of visual elements.

In one embodiment, when a rendering device displays a portion (e.g. a page) of an ERM, the rendering device also displays a graphical element that represents the ERM. For example, the graphical element may be a line or a bar that represents the contents of the ERM. The graphical element may be displayed in a portion of a display that is separate from the portion in which the ERM is displayed so that the portion of the ERM that is displayed is not covered or obscured by the graphical element. Displayed on or within proximity of the graphical element may be a current location indicator. This current location indicator indicates where the portion of the ERM that is currently being displayed is located within the ERM, and is placed at a position along the graphical element that corresponds to that location. For example, if the ERM is two hundred pages long and page one hundred of the ERM is currently being displayed, then the current location indicator may be placed at a midpoint of the graphical element to indicate that the currently displayed portion of the ERM is in the middle of the ERM.

If any bookmarks have been designated by a user, then one or more bookmark indicators may also be displayed on or within proximity of the graphical element. These bookmark indicators may be placed at positions along the graphical element that correspond to the locations (e.g. page numbers) within the ERM that have been bookmarked. For example, if the ERM is two hundred pages long, and a first bookmark has been placed at page fifty and a second bookmark has been placed at page one hundred fifty, then a first bookmark indicator may be placed at a position that is one-quarter of the way along the graphical element and a second bookmark indicator may be placed at a position that is three-quarters of the way into the graphical element. With the graphical element, the current location indicator, and the bookmark indicators presented in this way, it is easy for a user to visually determine where the portion of the ERM currently being displayed is located within the ERM, where the bookmarks are located within the ERM, and where the bookmarks are located relative to the current location and relative to each other. This graphical depiction of the bookmark information provides information that closely resembles what a user would be able to see by looking at the side of a physical book that has been bookmarked.

In addition to presenting bookmark information in an intuitive and easy to comprehend manner, one embodiment of the present invention may also facilitate the navigation to a bookmark. For example, a bookmark indicator displayed on or within proximity of the graphical element may be a selectable control element. When a use selects or invokes a bookmark indicator, content from the portion of the ERM that is associated with that bookmark indicator is displayed. In effect, selection of the bookmark indicator causes a rendering device to "jump" to that portion of the ERM. Thus, with the bookmark indicators, it is possible for a user to randomly and directly access any bookmarked portion of the ERM.

Alternatively or in addition to direct access, bookmarked portions may be sequentially accessed. This sequential access may be achieved, for example, through one or more sequential controls, which may include a previous bookmark control and a next bookmark control. These controls may be made available to a user, for example, by way of displayed control elements that the user can select or invoke. In response to user input to go to a previous bookmark, a determination is made as to which bookmarked portion of the ERM precedes and is closest to the location of the portion of the ERM that is currently being displayed. Content from that bookmarked portion of the ERM is displayed (in effect, the rendering device "jumps" to that portion of the ERM). In response to user input to go to a next bookmark, a determination is made as to which bookmarked portion of the ERM follows and is closest to the location of the portion of the ERM that is currently being displayed. Content from that bookmarked portion of the ERM is displayed (in effect, the rendering device "jumps" to that portion of the ERM). By using the previous bookmark control and/or the next bookmark control (perhaps repeatedly), a user can easily navigate from one bookmarked portion of the ERM to another in a sequential fashion.

In the manner discussed above, one embodiment of the present invention presents bookmark information to a user in an intuitive and easy to comprehend manner, and enables a user to navigate to one or more bookmarks quickly and conveniently. Thus, the embodiment provides an improved mechanism for presenting and navigating bookmarks in an ERM.

Implementing Device(s)

The techniques described herein may be implemented by any of a variety of rendering devices. As used herein, the term rendering device refers broadly to any device that is capable of rendering an ERM, or causing an ERM to be rendered, to a user. In one embodiment, a rendering device may take the form of a standalone device or a server device. Examples of a standalone rendering device include, but are not limited to, a desktop or laptop computer, a notebook computer, a tablet computer, a smartphone, a dedicated electronic reading device (often referred to as an eReader), etc. A standalone rendering device has all of the processing capability and input/output (I/O) components necessary to render an ERM to a user and to interact with the user. In contrast, a server rendering device is a device that works with a client device (e.g. over a network connection) to render an ERM to a user and to interact with the user. In a client-server arrangement, the client device (which may, for example, be a desktop or laptop computer, a notebook computer, a tablet computer, a smartphone, etc.) is used by the user to interact with the server device. The client device provides the I/O components (e.g. display, touch sensitive screen, mouse or other cursor control device, keyboard, etc.) that are necessary to render the ERM to the user and to interact with the user. Relying upon these I/O components of the client device, the server device interacts with the client device to cause an ERM to be rendered to a user and to receive input from the user. To enable interaction between the client device and the server device, the client device may execute a browser or one or more dedicated applications that enable the client device and the server device to communicate with and understand each other.

In the description that follows in later sections, techniques are described that include causing certain items (e.g. a portion of an ERM, user interface components, etc.) to be rendered/displayed to a user and receiving input from a user. These operations, as well as other operations of the techniques disclosed herein, may be performed by a standalone rendering device or a server rendering device. A standalone device may cause items to be rendered to a user and may receive input from a user by invoking and using its own local I/O components. In contrast, a server rendering device may cause items to be rendered to a user by generating and providing the items, and perhaps generating and providing some instructions, to the client device and having the client device use its I/O components to render the items to the user. A server rendering device may receive input from a user by receiving information passed on by the client device that reflects user input received by the I/O components of the client device. Thus, even though the underlying implementation details may be slightly different, it should be noted that the techniques described herein may be implemented by either a standalone rendering device or a server rendering device.

With reference to FIG. 1, there is show a block diagram of a computing device/system 100 that may be used to implement a rendering device, in accordance with one embodiment of the present invention. Computing device 100 may be used to implement a standalone rendering device or a server rendering device. If computing device 100 is used to implement a server rendering device, then some of the I/O components may not be needed.

As shown, computing device 100 includes a bus 102 or other communication mechanism for communicating information, and one or more hardware processors 104 coupled with bus 102 for processing information. Hardware processor 104 may be, for example, a general purpose microprocessor.

Computing device 100 also includes a main memory 106, such as a random access memory (RAM) or other storage device, coupled to bus 102 for storing information and instructions to be executed by processor 104. Main memory 106 also may be used for storing temporary variables or other intermediate information during execution of instructions by the processor 104. Such instructions, when executed by processor 104, render computing device 100 into a special-purpose machine that is customized to perform the operations specified in the instructions.

Computing device 100 may further include a read only memory (ROM) 108 or other static storage device coupled to bus 102 for storing static information and instructions for processor 104. A storage device 110, such as a magnetic disk, optical disk, or solid-state drive may be provided and coupled to bus 102 for storing information and instructions.

Computing device 100 may be coupled via bus 102 to a display 112 (e.g. a cathode ray tube (CRT) display, a liquid crystal (LCD) display, a plasma display, etc.) for displaying information to a user. An input device 114, including alphanumeric and other keys, may be coupled to bus 102 for communicating information and command selections to processor 104. Another type of user input device may be a cursor control device 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane. The display 112 may also be a touch sensitive screen so that in addition to being a display, it also acts as a user input device.

Computing device 100 may implement the techniques described herein using customized hard-wired logic, one or more ASICs or FPGAs, firmware and/or program logic which causes or programs computing device 100 to be a special-purpose machine. According to one embodiment, the techniques disclosed herein are performed by computing device 100 in response to processor 104 executing one or more sequences of one or more instructions contained in main memory 106. Such instructions may be read into main memory 106 from another storage medium, such as storage device 110. Execution of the sequences of instructions contained in main memory 106 causes processor 104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 110. Volatile media includes dynamic memory, such as main memory 106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 102. Transmission media can also take the form of acoustic or light waves, such as those generated during radio-wave and infra-red data communications.

Various forms of media may be involved in carrying one or more sequences of one or more instructions to processor 104 for execution. For example, the instructions may initially be carried on a magnetic disk or solid-state drive of a remote computer. The remote computer can load the instructions into its dynamic memory and send the instructions over a telephone line using a modem. A modem local to computing device 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computing device 100 may also include a communication interface 118 coupled to bus 102. Communication interface 118 provides a two-way data communication coupling to a network link 120 that is connected to a local network 122. For example, communication interface 118 may be an integrated services digital network (ISDN) card, cable modem, satellite modem, or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computing device 100, are example forms of transmission media.

Computing device 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution.

Sample Operation

With the above rendering device description in mind, and with reference to FIGS. 1-5, a sample operation of a rendering device 100, in accordance with one embodiment of the present invention, will now be described.

Sample Display

With reference to FIG. 2, there is shown a sample display 200 that may be rendered by a rendering device 100 in response to a user instructing the rendering device 100 to render an ERM. In one embodiment, the display 200 includes a content portion 202 for showing the content from the ERM, and a bookmark portion 204 for showing bookmark controls and bookmark information pertaining to the ERM. In one embodiment, the bookmark portion 204 is displayed separately from the content portion 202. Doing so enables the bookmark controls and bookmark information to be viewed by the user without covering or obscuring the content of the ERM. This is just one possible embodiment, however. If so desired, the bookmark controls and bookmark information may be displayed in the same display portion as the content of the ERM. In one embodiment, the bookmark portion 204 is displayed constantly. Alternatively, the bookmark portion 204 may be displayed only when a user instructs the rendering device 100 to show the bookmark portion 204 (e.g. by invoking a control element, by placing a cursor over a control element or over a certain area of the display (e.g. a mouse-over event), by providing input from a keyboard or other input device, etc.). For the sake of simplicity, only portions 202 and 204 of the display 200 are shown in FIG. 2. Display 200 may further include other portions, such as, for example, portions that show other content, menus, control elements, etc.

Content portion 202 shows content from the ERM. Most likely, an ERM is too voluminous for all of its content to be fully shown in content portion 202 all at once; thus, content portion 202 usually shows only a portion of the ERM at a time. For purposes of the following discussion, it will be assumed that an ERM is divided into pages (where each page represents a portion of the ERM); however, it should be noted that an ERM may be divided into other types of portions (e.g. paragraphs, chapters, sections, etc.), if so desired. Content portion 202 may show content from a single page, or it may show content from multiple pages (e.g. the left side of portion 202 may show one page and the right side of portion 202 may show another page). For the remainder of this disclosure, it will be assumed for the sake of example that content portion 202 shows just a single page. If portion 202 is not long enough or wide enough to show all of the content from a page, then a user may need to scroll up and down and/or left and right to see all of the content from that page.

In one embodiment, the bookmark portion 204 shows bookmark controls and bookmark information for the ERM that is being rendered. For example, bookmark portion 204 may include an add bookmark control element 210 and a remove bookmark control element 212. These controls elements 210, 212 may be selected or invoked by a user to add or remove a bookmark from the page that is currently being displayed in content portion 202. Bookmark portion 204 may also include a previous bookmark control element 232 and a next bookmark control element 234. These control elements 232, 234 may be selected or invoked by a user to jump to a previous bookmarked page or a next bookmarked page. With these control elements 232, 234, it is easy for a user to jump from an un-bookmarked page to a bookmarked page, and to jump sequentially from bookmarked page to bookmarked page.

The bookmark portion 204 may further include a graphical depiction 208 of the bookmark information associated with the ERM. In one embodiment, the graphical depiction 208 comprises a graphical element 214 that represents the contents of the ERM. In the example shown, the graphical element 214 takes the form of a line. However, if so desired, the graphical element 214 may take on other forms (e.g. a bar, etc.). All possible forms are within the scope of the present invention. The graphical depiction 208 may also comprise a current location indicator 216. This indicator 216 indicates where the page currently displayed in content portion 202 is located within the ERM. The current location indicator 216 is placed at a position along the graphical element 214 that corresponds to the location of the currently displayed page within the ERM. In the example shown in FIG. 2, the page currently being displayed is near the middle of the ERM; thus, the current location indicator 216 is placed near the midpoint of the graphical element 214. In FIG. 2, the current location indicator 216 is placed on the graphical element 214; this is not required. If so desired, the current locator indicator 216 may be placed within proximity of (but not on) the graphical element 214 instead.

The graphical depiction 208 may further comprise one or more bookmark indicators 218(1), 218(2). These bookmark indicators 218(1), 218(2) indicate where, within the ERM, one or more user-designated bookmarks have been placed. In one embodiment, each bookmark indicator 218(1), 218(2) is associated with a bookmark, which in turn is associated with a page within the ERM, and each bookmark indicator 218(1), 218(2) is placed at a position along the graphical element 214 that corresponds to the location of its associated page within the ERM. In the example shown in FIG. 2, a first bookmark has been placed at a page that is about a quarter of the way into the ERM; thus, a first bookmark indicator 218(1) is placed at a position along the graphical element 214 that is one-quarter of the way along the graphical element 214. Also, a second bookmark has been placed at a page that is about three-quarters of the way into the ERM; thus, a second bookmark indicator 218(2) is placed at a position along the graphical element 214 that is three-quarters of the way along the graphical element 214. In FIG. 2, the bookmark indicators 218(1), 218(2) are placed within proximity of (but not on) the graphical element 214; this is not required. If so desired, the bookmark indicators 218(1), 218(2) may be placed on the graphical element 214 instead.

Together, the graphical element 214, the current location indicator 216, and the bookmark indicators 218(1), 218(2) provide a graphical depiction 208 of the bookmark information associated with an ERM. With this graphical depiction 208, it is easy for a user to visually discern where the portion of the ERM currently being displayed is located within the ERM, where one or more bookmarks are located within the ERM, and where the bookmarks are located relative to the current location and relative to each other. This graphical depiction 208 provides information that closely resembles information that a user would derive by looking at the side of a physical book that has been bookmarked.

In one embodiment, the bookmark indicators 218(1), 218(2) are control elements that can be selected or invoked by a user. In response to a bookmark indicator 218(1), 218(2) being selected or invoked, a rendering device 100 causes the page associated with that bookmark indicator 218(1), 218(2) to be accessed (in effect, the rendering device "jumps" to that page), and causes the content from that page to be displayed in content portion 202. Thus, with the bookmark indicators 218(1), 218(2), a user can randomly and directly access any page that has been bookmarked.

In the example shown in FIG. 2, the bookmark portion 204 includes the graphical depiction 208 and the bookmark control elements 210, 212, 232, 234; this is not required. If so desired, the bookmark portion 204 may show just the graphical depiction 208 or just the bookmark control elements 210, 212, 232, 234 (or a subset thereof). These and other modifications are within the scope of the present invention.

In addition to or in lieu of displaying the bookmark control elements in bookmark portion 204, one or more bookmark control elements may be displayed in the content portion 202 of the display 200. For example, as shown in FIG. 2, a previous bookmark control element 242 (which has the same functionality as control element 232) and a next bookmark control element 244 (which has the same functionality as control element 234) may be displayed in the content portion 202 of the display 200. These control elements 242, 244 may be displayed constantly, or they may be displayed only when instructed to do so by a user (e.g. by invoking a bookmark control element 240 that is displayed in content portion 202, by placing a cursor over element 240 (e.g. a mouse-over event), by providing input from a keyboard or other input device, etc.). Other bookmark control elements may be displayed in content portion 202 as well, if so desired. These control elements provide a user with greater access to the bookmark control capabilities provided by an embodiment of the present invention.

Sample Operating Sequence

To further illustrate the operation of a rendering device 100 in accordance with one embodiment of the present invention, reference will now be made to an example. Suppose that a rendering device 100 receives input from a user to begin rendering content from a particular ERM. In response to this user input, the rendering device 100 accesses the ERM. The rendering device 100 may do so, for example, by obtaining the ERM from one of the local storages 106, 110 or by downloading the ERM from a remote device. Once the ERM is accessed, the rendering device 100 determines how long the ERM is. For the sake of example, it will be assumed that the rendering device 100 determines the ERM to be two hundred pages long. The rendering device 100 also causes a display 200, such as that shown in FIG. 2, to be rendered. As part of causing the display 200 to be rendered, the rendering device 100 causes a portion of the ERM to be displayed in the content portion 202 of the display 200. In the current example, it will be assumed that the rendering device 100 causes the first page of the ERM to be initially displayed in content portion 202.

The rendering device 100 may further cause a bookmark portion 204 to be displayed. As shown in FIG. 2, the bookmark portion 204 may include one or more control elements 210, 212, 232, 234, and a graphical depiction 208 of the bookmark information for the ERM. In the current example, the graphical depiction 208 may take the form shown in FIG. 3A. To cause the graphical depiction 208 to be displayed, the rendering device 100 causes a graphical element 214, which represents the contents of the ERM, to be displayed. The rendering device 100 may generate the graphical element 214 or may access a pre-generated version of the graphical element 214. The rendering device 100 also causes a current location indicator 216 to be included in the graphical depiction 208. In the current example, the page currently displayed in the content portion 202 of the display 200 is the first page of the ERM. Thus, the rendering device 100 places the current location indicator 216 at the leftmost edge of the graphical element 214 to show that the page currently being displayed is located at the beginning of the ERM. In the current example, it will be assumed that no bookmarks have yet been placed by the user in the ERM; thus, no bookmark indicators are included in the graphical depiction 208.

Suppose now that the user makes his way to page twenty five of the ERM and decides to place a bookmark on that page. To do so, the user may invoke the add bookmark control element 210, or provide some other user input using some other input mechanism to indicate that the user wishes to associate a bookmark with this page. In response to this user input, the rendering device 100 may perform several operations. Initially, the rendering device 100 updates a set of bookmark information associated with the ERM. In one embodiment, the bookmark information includes information for each page that has been bookmarked in the ERM. The information for a bookmarked page may include, for example, the page number for that page (i.e. the location of that page within the ERM) and perhaps an identifier for the bookmark. In one embodiment, the bookmark information is stored in a sorted list that is sorted by page number; however, this is not required. For purposes of the present invention, the bookmark information may be stored in any desired manner using any desired data structure (e.g. linked list, table, comma separated values, flat file, etc.). In the current example, the bookmark information is updated by adding page twenty five to the list, and by assigning and storing a bookmark identifier for the bookmark. The sorted list may now contain the information shown below.

| Bookmarked Page Number | Bookmark ID |
|---|---|
| 25 | BK1 |

In addition to updating the bookmark information, the rendering device 100 may also update the graphical depiction 208 of the bookmark information. The graphical depiction 208 may be updated to that shown in FIG. 3B. Since the page now being displayed in content portion 202 is page twenty five, and since the ERM is two hundred pages long, the rendering device 100 determines that the currently displayed page is one-eighth of the way into the ERM; hence, the rendering device 100 causes the current location indicator 216 to be placed at a location (indicated by arrow 302(1)) that is one-eighth of the way along the graphical element 214. The rendering device 100 does this before the user places a bookmark on page twenty five. Then, in response to the user placing a bookmark on page twenty five, the rendering device 100 causes a bookmark indicator 218(1), which is associated with bookmark BK1 and page twenty five, to be added to the graphical depiction 208. Since this bookmark indicator 218(1) is associated with page twenty five, it is placed at the position (indicated by arrow 302(1)) along the graphical element 214 that corresponds to page twenty five.

Suppose now that the user makes his way further to page fifty of the ERM and decides to place a bookmark on that page as well. To do so, the user may invoke the add bookmark control element 210, or provide some other user input using some other input mechanism to indicate that the user wishes to associate a bookmark with this page. In response to this user input, the rendering device 100 may perform operations similar to those described above. Specifically, the rendering device 100 may update the set of bookmark information associated with the ERM to include a reference to page fifty and an identifier for the new bookmark. After updating, the sorted list may contain the information shown below.

| Bookmarked Page Number | Bookmark ID |
|---|---|
| 25 | BK1 |
| 50 | BK2 |

Additionally, the rendering device 100 may update the graphical depiction 208 of the bookmark information. The graphical depiction 208 may be updated to that shown in FIG. 3C. Since the page currently displayed in content portion 202 is now page fifty, and since the ERM is two hundred pages long, the rendering device 100 determines that the currently displayed page is one-fourth of the way into the ERM; hence, the rendering device 100 causes the current location indicator 216 to be moved/placed at a location (indicated by arrow 302(2)) that is one-fourth of the way along the graphical element 214. The rendering device 100 does this before the user places a bookmark on page fifty. Then, in response to the user placing a bookmark on page fifty, the rendering device 100 causes a bookmark indicator 218(2), which is associated with bookmark BK2 and page fifty, to be added to the graphical depiction 208. Since this bookmark indicator 218(2) is associated with page fifty, it is placed at the position (indicated by arrow 302(2)) along the graphical element 214 that corresponds to page fifty.

Suppose further that the user makes his way to page one hundred fifty and places a bookmark there. In response to this user input, the rendering device 100 may operate in the manner described above to update the sorted list and to update the graphical depiction 208. Once updated, the sorted list may contain the information shown below.

| Bookmarked Page Number | Bookmark ID |
|---|---|
| 25 | BK1 |
| 50 | BK2 |
| 150 | BK3 |

Figure 3A:
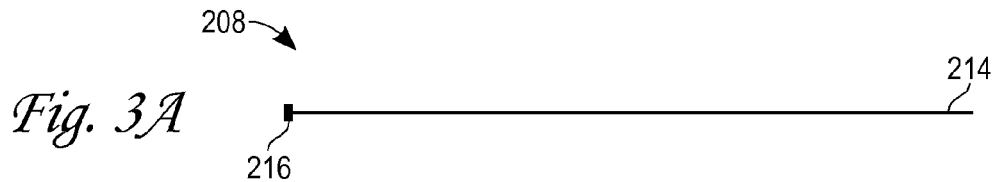
FIGS. 3A-3E show sample graphical depictions of bookmark information associated with an ERM, illustrating how bookmarks may be added, in accordance with one embodiment of the present invention.
Figure 3B:
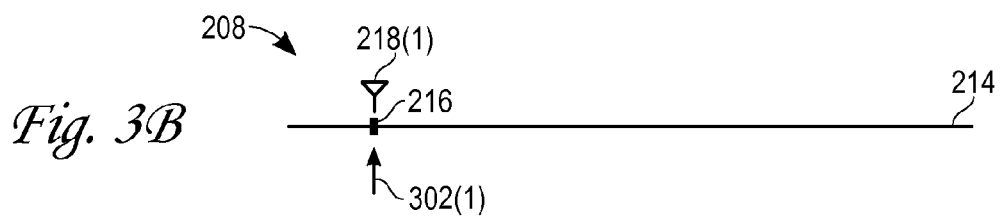
Figure 3C:
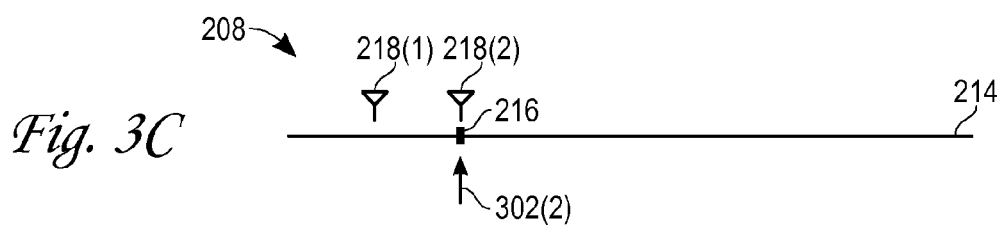
Figure 3D:
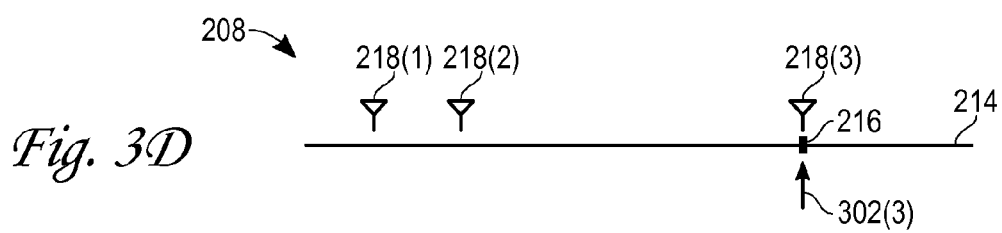

Once updated, the graphical depiction 208 may take the form shown in FIG. 3D. Since the page currently displayed in content portion 202 is now page one hundred fifty, and since the ERM is two hundred pages long, the rendering device 100 determines that the currently displayed page is three-fourths of the way into the ERM; hence, the rendering device 100 causes the current location indicator 216 to be moved/placed at a location (indicated by arrow 302(3)) that is three-fourths of the way along the graphical element 214. The rendering device 100 does this before the user places a bookmark on page one hundred fifty. Then, in response to the user placing a bookmark on page one hundred fifty, the rendering device 100 causes a bookmark indicator 218(3), which is associated with bookmark BK3 and page one hundred fifty, to be added to the graphical depiction 208. Since this bookmark indicator 218(3) is associated with page one hundred fifty, it is placed at the position (indicated by arrow 302(3)) along the graphical element 214 that corresponds to page one hundred fifty.

Suppose further that the user makes his way to page one hundred seventy five and places a bookmark there. In response to this user input, the rendering device 100 may operate in the manner described above to update the sorted list and to update the graphical depiction 208. Once updated, the sorted list may contain the information shown below.

| Bookmarked Page Number | Bookmark ID |
|---|---|
| 25 | BK1 |
| 50 | BK2 |
| 150 | BK3 |
| 175 | BK4 |

Figure 3E:
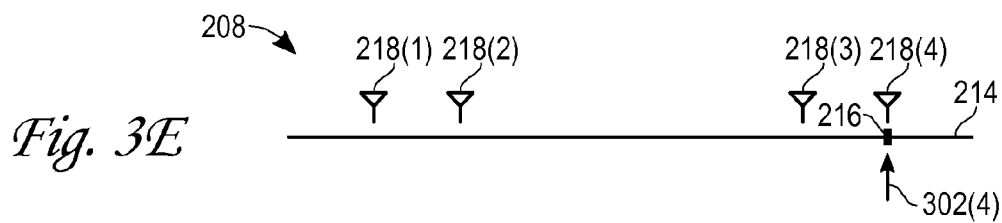
Figure 4A:
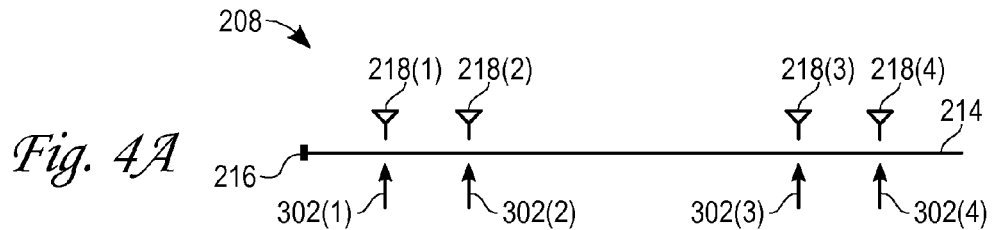
FIGS. 4A-4C show sample graphical depictions of bookmark information associated with an ERM, illustrating how a user may access bookmarks randomly and directly, in accordance with one embodiment of the present invention.
Figure 4B:
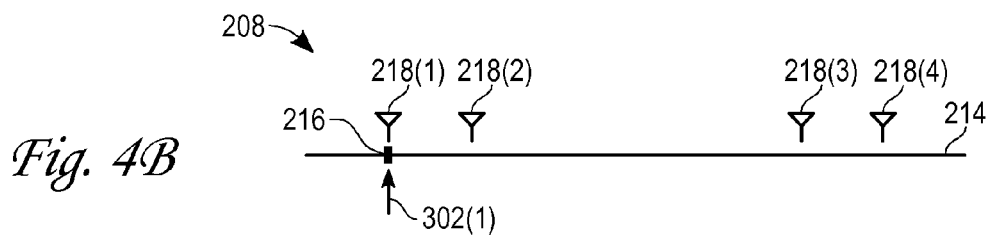
Figure 4C:
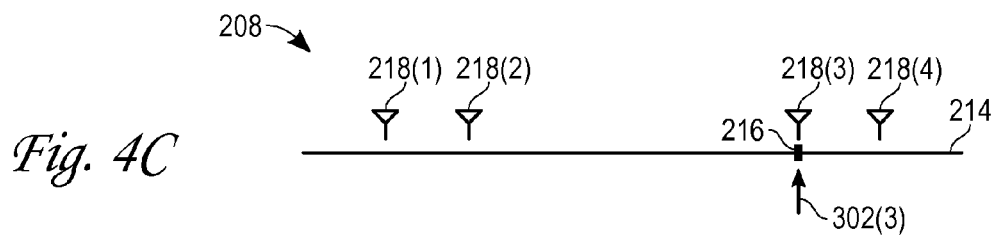

Once updated, the graphical depiction 208 may take the form shown in FIG. 3E. Since the page currently displayed in content portion 202 is now page one hundred seventy five, and since the ERM is two hundred pages long, the rendering device 100 determines that the currently displayed page is seven-eighths of the way into the ERM; hence, the rendering device 100 causes the current location indicator 216 to be moved/placed at a location (indicated by arrow 302(4)) that is seven-eighths of the way along the graphical element 214. The rendering device 100 does this before the user places a bookmark on page one hundred fifty. Then, in response to the user placing a bookmark on page one hundred seventy five, the rendering device 100 causes a bookmark indicator 218(4), which is associated with bookmark BK4 and page one hundred seventy five, to be added to the graphical depiction 208. Since this bookmark indicator 218(4) is associated with page one hundred seventy five, it is placed at the position (indicated by arrow 302(4)) along the graphical element 214 that corresponds to page one hundred seventy five.

Suppose now that the user instructs the rendering device 100 to stop rendering the ERM. Suppose further that at a later time, the user instructs the rendering device 100 to render the ERM again. In response to the user input to render the ERM again, the rendering device 100 accesses the ERM, and determines how many pages are in the ERM (two hundred pages in the current example). The rendering device 100 also causes a display 200, such as that shown in FIG. 2, to be rendered. As part of causing the display 200 to be rendered, the rendering device 100 causes a portion of the ERM to be displayed in the content portion 202 of the display 200. In the current example, it will be assumed that the rendering device 100 causes the first page of the ERM to be initially displayed in content portion 202.

The rendering device 100 may further cause a bookmark portion 204 to be displayed. As shown in FIG. 2, the bookmark portion 204 may include one or more control elements 210, 212, 232, 234, and a graphical depiction 208 of the bookmark information for the ERM. In the current example, the graphical depiction 208 may take the form shown in FIG. 4A. To cause the graphical depiction 208 to be displayed, the rendering device 100 initially causes a graphical element 214, which represents the contents of the ERM, to be displayed. The rendering device 100 may generate the graphical element 214 or may access a pre-generated version of the graphical element 214. The rendering device 100 also causes a current location indicator 216 to be included in the graphical depiction 208. In the current example, the page currently displayed in the content portion 202 of the display 200 is the first page of the ERM. Thus, the rendering device 100 places the current location indicator 216 at the leftmost edge of the graphical element 214 to show that the page currently being displayed is located at the beginning of the ERM. The rendering device 100 further causes one or more bookmark indicators to be added to the graphical depiction 208. To do so, the rendering device 100 accesses the bookmark information associated with the ERM that is stored in the sorted list that was constructed previously. In the current example, the sorted list indicates that there is a bookmark at page twenty five, at page fifty, at page one hundred fifty, and at page one hundred seventy five of the ERM. Thus, based upon this bookmark information, the rendering device 100 proceeds to add four bookmark indicators to the graphical depiction 208.

Starting with the bookmark BK1 on page twenty five, the rendering device 100 determines that this bookmark is at a page that is one-eighth (25/200) of the way into the ERM.

Thus, the rendering device 100 causes a bookmark indicator 218(1) to be added to the graphical depiction 208, and places this bookmark indicator 218(1) at a position (indicated by arrow 302(1)) that is one-eighth of the way along the graphical element 214. In this manner, a bookmark indicator 218(1) associated with page twenty five is placed at a position along the graphical element 214 that corresponds to page twenty five.

Proceeding to the bookmark BK2 on page fifty, the rendering device 100 determines that this bookmark is at a page that is one-fourth (50/200) of the way into the ERM. Thus, the rendering device 100 causes a bookmark indicator 218(2) to be added to the graphical depiction 208, and places this bookmark indicator 218(2) at a position (indicated by arrow 302(2)) that is one-fourth of the way along the graphical element 214. Hence, a bookmark indicator 218(2) associated with page fifty is placed at a position along the graphical element 214 that corresponds to page fifty.

Proceeding to the bookmark BK3 on page one hundred fifty, the rendering device 100 determines that this bookmark is at a page that is three-fourths (150/200) of the way into the ERM. Thus, the rendering device 100 causes a bookmark indicator 218(3) to be added to the graphical depiction 208, and places this bookmark indicator 218(3) at a position (indicated by arrow 302(3)) that is three-fourths of the way along the graphical element 214. Consequently, a bookmark indicator 218(3) associated with page one hundred fifty is placed at a position along the graphical element 214 that corresponds to page one hundred fifty.

Finally, for the bookmark BK4 on page one hundred seventy five, the rendering device 100 determines that this bookmark is at a page that is seven-eighths (175/200) of the way into the ERM. Thus, the rendering device 100 causes a bookmark indicator 218(4) to be added to the graphical depiction 208, and places this bookmark indicator 218(4) at a position (indicated by arrow 302(4)) that is seven-eighths of the way along the graphical element 214. In this manner, a bookmark indicator 218(4) associated with page one hundred seventy five is placed at a position along the graphical element 214 that corresponds to page one hundred seventy five. With all of the bookmark indicators 218(1), 218(2), 218(3), 218(4) thus added and placed, rendering of the graphical depiction 208 is complete.

In one embodiment, each of the bookmark indictors 218(1), 218(2), 218(3), 218(4) in the graphical depiction 208 is a control element that can be selected or invoked by the user. In response to a bookmark indicator 218 being selected or invoked, the rendering device 100 accesses the page of the ERM that is associated with that bookmark indicator 218, and causes the content from that page to be displayed in the content portion 202 of the display 200. In effect, the rendering device 100 "jumps" to the bookmarked page. Thus, with the bookmark indicators, a user can randomly and directly access any page that has been bookmarked.

To illustrate, suppose that the user selects or invokes bookmark indicator 218(1). In response to this user input, the rendering device 100 determines, based for example upon information associated with or attached to the bookmark indicator 218(1), that the bookmark indicator 218(1) is associated with bookmark BK1 and page twenty five of the ERM. Armed with this knowledge, the rendering device 100 accesses page twenty five of the ERM, and causes content from that page to be displayed in the content portion 202 of the display 200. In addition, the rendering device 100 determines that page twenty five is one-eighth (25/200) of the way into the ERM. Thus, the rendering device 100 causes the graphical depiction 208 to be updated to that shown in FIG. 4B by moving the current location indicator 216 to a position (indicated by arrow 302(1)) along the graphical element 214 that is one-eighth of the way along the graphical element 214. In this manner, the rendering device 100 "jumps" to the page associated with the bookmark indicator 218(1).

Suppose further that the user now selects or invokes bookmark indicator 218(3). In response to this user input, the rendering device 100 determines, based for example upon information associated with or attached to the bookmark indicator 218(3), that the bookmark indicator 218(3) is associated with bookmark BK3 and page one hundred fifty of the ERM. Armed with this knowledge, the rendering device 100 accesses page one hundred fifty of the ERM, and causes content from that page to be displayed in the content portion 202 of the display 200. In addition, the rendering device 100 determines that page one hundred fifty is three-fourths (150/200) of the way into the ERM. Thus, the rendering device 100 causes the graphical depiction 208 to be updated to that shown in FIG. 4C by moving the current location indicator 216 to a position (indicated by arrow 302(3)) along the graphical element 214 that is three-fourths of the way along the graphical element 214. In this manner, the rendering device 100 "jumps" to the page associated with the bookmark indicator 218(3). By selecting or invoking the bookmark indicators 218(1), 218(2), 218(3), 218(4), the user can directly and randomly access any of the bookmarked pages.

In some instances, a user may prefer to access bookmarked pages sequentially rather than directly and randomly. In such instances, the user may invoke the sequential bookmark controls 232, 234 (or sequential bookmark controls 242, 244, or some other user controls (e.g. directional keyboard keys or other keyboard keys, etc.)) to access a previous bookmarked page or a next bookmarked page. To illustrate how a rendering device 100 may carry out sequential accessing of bookmarked pages, reference will be made to an example.

Suppose that the page currently being displayed in content portion 202 is page one hundred of the ERM, which is halfway (100/200) into the ERM. In such a case, the graphical depiction 208 of the bookmark information may be that shown in FIG. 5A, wherein the current location indicator 216 is placed at a position that is halfway along the graphical element 214. As can be seen from FIG. 5A, at the current page, there are two bookmarked pages (those pages associated with bookmark indicators 218(1) and 218(2)) that precede the current page, and two bookmarked pages (those pages associated with bookmark indicators 218(3) and 218 (4)) that follow the current page.

Suppose now that the rendering device 100 receives user input to navigate to a previous bookmarked page. In response to this input, the rendering device 100 determines which bookmarked page precedes and is closest to the currently displayed page. The rendering device 100 may make this determination by consulting the bookmark information stored in the aforementioned sorted list. From the sorted list, the rendering device 100 can see that there are two bookmarked pages (pages twenty five and fifty) that precede the currently displayed page (page one hundred). Of these two bookmarked pages, page fifty is the closest to page one hundred; thus, page fifty is the bookmarked page that is selected. In response to this selection, the rendering device 100 accesses page fifty of the ERM, and causes the content from that page to be displayed in the content portion 202 of the display (in effect, the rendering device 100 "jumps" to page fifty). In addition, the rendering device 100 updates the graphical depiction 208 of the bookmark information to that shown in FIG. 5B. Since the currently displayed page is now page fifty, and since page fifty is one-fourth (50/200) of the way into the ERM, the rendering device 100 causes the current location indicator 216 to be moved/placed at a position (indicated by arrow 302(2)) that is one-fourth of the way along the graphical element 214.

Suppose now that the rendering device 100 once again receives input from the user to navigate to a previous bookmarked page. In response to this input, the rendering device 100 determines which bookmarked page precedes and is closest to the currently displayed page. The rendering device 100 may make this determination by again consulting the bookmark information stored in the sorted list. From the sorted list, the rendering device 100 can see that there is only one bookmarked page (page twenty five) that precedes the currently displayed page (page fifty); thus, the rendering device 100 selects page twenty five. In response to this selection, the rendering device 100 accesses page twenty five of the ERM, and causes the content from that page to be displayed in the content portion 202 of the display (in effect, the rendering device 100 "jumps" to page twenty five). In addition, the rendering device 100 updates the graphical depiction 208 of the bookmark information to that shown in FIG. 5C. Since the currently displayed page is now page twenty five, and since page twenty five is one-eighth (25/200) of the way into the ERM, the rendering device 100 causes the current location indicator 216 to be moved/placed at a position (indicated by arrow 302(1)) that is one-eighth of the way along the graphical element 214.

Figure 5A:
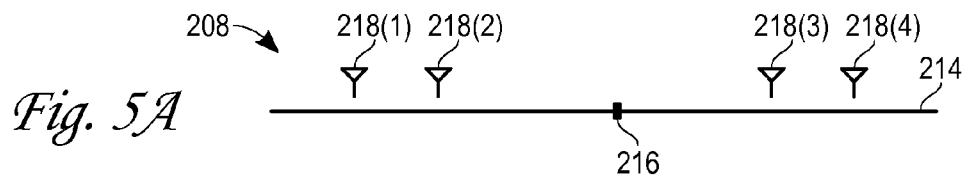
FIGS. 5A-5E show sample graphical depictions of bookmark information associated with an ERM, illustrating how a user may access bookmarks sequentially, in accordance with one embodiment of the present invention.
Figure 5B:
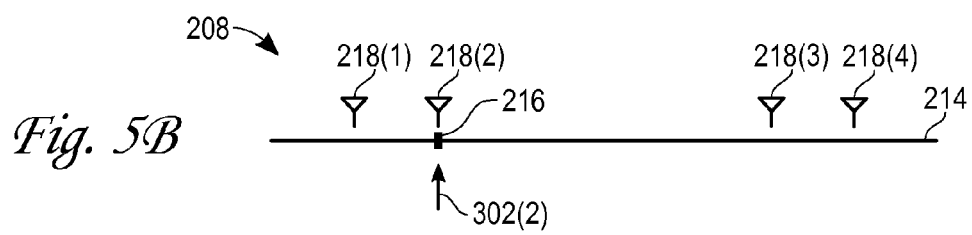
Figure 5C:
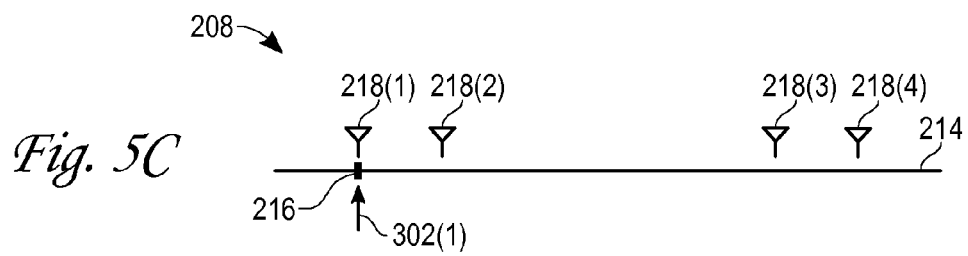
Figure 5D:
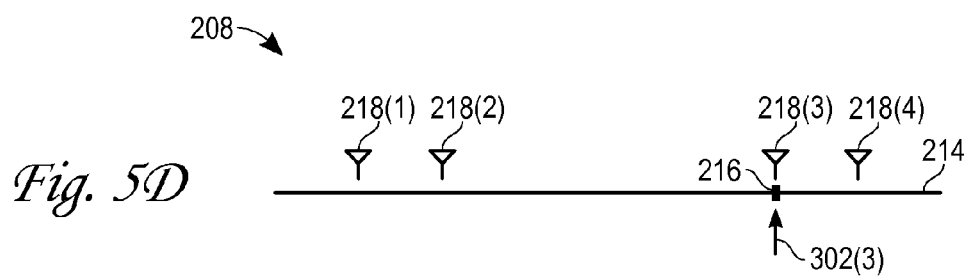
Figure 5E:
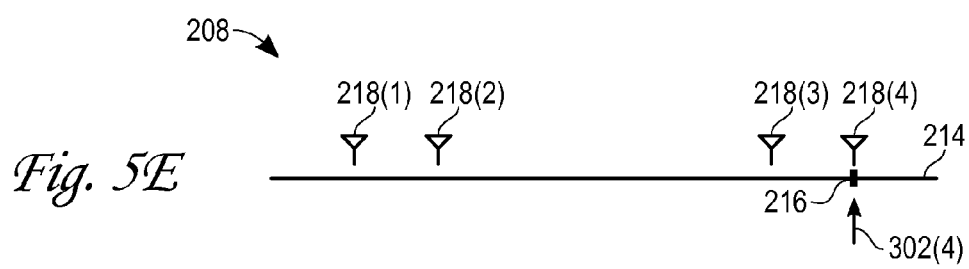

Returning to the example of FIG. 5A, suppose that while displaying content from page one hundred of the ERM, the rendering device 100 receives user input to navigate to a next bookmarked page. In response to this input, the rendering device 100 determines which bookmarked page follows and is closest to the currently displayed page. The rendering device 100 may make this determination by consulting the bookmark information stored in the sorted list. From the sorted list, the rendering device 100 can see that there are two bookmarked pages (pages one hundred fifty and one hundred seventy five) that follow the currently displayed page (page one hundred). Of these two bookmarked pages, page one hundred fifty is the closest to page one hundred; thus, page one hundred fifty is the bookmarked page that is selected. In response to this selection, the rendering device 100 accesses page one hundred fifty of the ERM, and causes the content from that page to be displayed in the content portion 202 of the display (in effect, the rendering device 100 "jumps" to page one hundred fifty). In addition, the rendering device 100 updates the graphical depiction 208 of the bookmark information to that shown in FIG. 5D. Since the currently displayed page is now page one hundred fifty, and since page one hundred fifty is three-fourths (150/200) of the way into the ERM, the rendering device 100 causes the current location indicator 216 to be moved/placed at a position (indicated by arrow 302(3)) that is three-fourths of the way along the graphical element 214.

Suppose now that the rendering device 100 once again receives input from the user to navigate to a next bookmarked page. In response to this input, the rendering device 100 determines which bookmarked page follows and is closest to the currently displayed page. The rendering device 100 may make this determination by again consulting the bookmark information stored in the sorted list. From the sorted list, the rendering device 100 can see that there is only one bookmarked page (page one hundred seventy five) that follows the currently displayed page (page one hundred fifty); thus, the rendering device 100 selects page one hundred seventy five. In response to this selection, the rendering device 100 accesses page one hundred seventy five of the ERM, and causes the content from that page to be displayed in the content portion 202 of the display (in effect, the rendering device 100 "jumps" to page one hundred seventy five). In addition, the rendering device 100 updates the graphical depiction 208 of the bookmark information to that shown in FIG. 5E. Since the currently displayed page is now page one hundred seventy five, and since page one hundred seventy five is seven-eighths (175/200) of the way into the ERM, the rendering device 100 causes the current location indicator 216 to be moved/placed at a position (indicated by arrow 302(4)) that is seven-eighths of the way along the graphical element 214.

In the manner described, the rendering device 100 allows a user to navigate sequentially from bookmarked page to bookmarked page, and from an un-bookmarked page to a bookmarked page.

VARIATIONS/MODIFICATIONS

In the embodiment described above, all of the following aspects are implemented: (1) rendering a graphical depiction of a set of bookmark information associated with an ERM; (2) allowing bookmarked portions of an ERM to be randomly and directly accessed; and (3) allowing bookmarked portions of an ERM to be sequentially accessed. It should be noted, however, that these aspects need not necessarily be implemented in combination. If so desired, each aspect may be implemented on its own without implementing the other aspects, or various subsets of the aspects may be implemented in combination without the other aspect. These and other variations/modifications are within the scope of the present invention.

At this point, it should be noted that although the invention has been described with reference to specific embodiments, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A method comprising:
    causing content from a particular portion of a set of electronic reading material (ERM) to be displayed in a graphical user interface, wherein the particular portion is located at a particular location within the ERM;
    wherein a plurality of user-designated bookmarks have been associated with respective bookmark locations within the ERM;
    detecting a first invocation of a previous bookmark control element displayed in the graphical user interface;
    in response to detecting the first invocation of the previous bookmark control element:
        determining that a first user-designated bookmark, of the plurality of user-designated bookmarks, is associated with a first bookmark location within the ERM that:
            precedes the particular location, and
            is closer to the particular location than any other bookmark location that precedes the particular location;
        causing content from a first portion of the ERM that is associated with the first bookmark location to be displayed;

while displaying content from the first portion of the ERM, detecting a second invocation of the same previous bookmark control element;
in response to detecting the second invocation of the previous bookmark control element:
determining that a second user-designated bookmark, of the plurality of user-designated bookmarks, is associated with a second bookmark location within the ERM that:
precedes the first bookmark location, and
is closer to the first bookmark location than any other bookmark location that precedes the first bookmark location; and
causing content from a second portion of the ERM that is associated with the second bookmark location to be displayed;
wherein the method is performed by one or more computing devices.

2. The method of claim 1, further comprising:
while displaying content from a certain portion of the ERM that is located at a certain location within the ERM, detecting a first invocation of a next bookmark control element displayed in the graphical user interface;
in response to detecting the first invocation of the next bookmark control element:
determining that a third user-designated bookmark, of the plurality of user-designated bookmarks, is associated with a third bookmark location within the ERM that:
follows the certain location, and
is closer to the certain location than any other bookmark location that follows the certain location;
causing content from a third portion of the ERM that is associated with the third bookmark location to be displayed;
while displaying content from the third portion of the ERM, detecting a second invocation of the same next bookmark control element;
in response to detecting the second invocation of the next bookmark control element:
determining that a fourth user-designated bookmark, of the plurality of user-designated bookmarks, is associated with a fourth bookmark location within the ERM that:
follows the third bookmark location, and
is closer to the third bookmark location than any other bookmark location that follows the third bookmark location; and
causing content from a fourth portion of the ERM that is associated with the fourth bookmark location to be displayed.

3. The method of claim 2, further comprising:
while content from the particular portion of the ERM is being displayed in the graphical user interface:
causing an ERM content graphical element that represents the contents of the ERM to be displayed; and
causing a current location indicator to be displayed on or within proximity of the ERM content graphical element, wherein the current location indicator is placed at a particular position along the ERM content graphical element that corresponds to the particular location within the ERM where the particular portion of the ERM is located;
in response to detecting the first invocation of the next bookmark control element:
causing the current location indicator to be moved to a certain position along the ERM content graphical element that corresponds to the third bookmark location within the ERM.

4. The method of claim 1, further comprising:
while content from the particular portion of the ERM is being displayed in the graphical user interface:
causing an ERM content graphical element that represents the contents of the ERM to be displayed; and
causing a current location indicator to be displayed on or within proximity of the ERM content graphical element, wherein the current location indicator is placed at a particular position along the ERM content graphical element that corresponds to the particular location within the ERM where the particular portion of the ERM is located.

5. The method of claim 4, further comprising:
in response to detecting the first invocation of the previous bookmark control element:
causing the current location indicator to be moved to a certain position along the ERM content graphical element that corresponds to the first bookmark location within the ERM.

6. A method, comprising:
displaying, in a graphical user interface, a content graphical element that represents a set of electronic reading material (ERM);
wherein one or more user-designated bookmarks have been associated with respective bookmark locations within the ERM;
displaying, in the graphical user interface, and for each user-designated bookmark of the one or more user-designated bookmarks, a bookmark graphical element in visual association with the content graphical element;
wherein each bookmark graphical element is placed at a position, along the content graphical element, that corresponds to the bookmark location associated with the user-designated bookmark that corresponds to the bookmark graphical element;
detecting invocation of a first bookmark graphical element that is displayed at a first position along the content graphical element;
wherein the first bookmark graphical element corresponds to a first bookmark location within the ERM; and
in response to detecting invocation of the first bookmark graphical element:
displaying, in the graphical user interface, a first portion of the ERM that is located at the first bookmark location;
wherein the method is performed by one or more computing devices.

7. The method of claim 6, further comprising:
while displaying the first portion of the ERM, causing a current location indicator to be displayed in visual association with the content graphical element;
wherein the current location indicator is placed at the first position along the content graphical element.

8. The method of claim 7, wherein:
the content from the ERM is caused to be displayed in a first portion of the graphical user interface; and
the content graphical element, one or more bookmark graphical elements displayed in visual association with the content graphical element, and the current location indicator are caused to be displayed in a second portion, of the graphical user interface, that is separate from the first portion of the graphical user interface.

9. The method of claim 6, further comprising:
detecting invocation of a second bookmark graphical element that is displayed in visual association with the content graphical element;
wherein the second bookmark graphical element corresponds to a second bookmark location, within the ERM, that is distinct from the first bookmark location; and
in response to detecting invocation of the second bookmark graphical element:
displaying, in the graphical user interface, a second portion of the ERM that is located at the second bookmark location.

10. The method of claim 6, further comprising:
detecting a user command to insert a second user-designated bookmark identifying a second portion of the ERM, wherein the second portion is located at a second bookmark location within the ERM that is different from the first bookmark location; and
causing a second bookmark graphical element to be displayed in visual association with the content graphical element;
wherein the second bookmark graphical element is placed at a second position along the content graphical element that corresponds to the second bookmark location within the ERM;
wherein the second position is different from the first position.

11. The method of claim 6, further comprising:
receiving user instruction to navigate to a particular location, within the ERM, that is distinct from the first bookmark location;
wherein a particular portion of the ERM is located at the particular location within the ERM;
in response to receiving the user instruction to navigate to the particular location within the ERM:
displaying, in the graphical user interface, the particular portion of the ERM, and
displaying a current location indicator, in visual association with the content graphical element, at a particular position, along the content graphical element, that corresponds to the particular location within the ERM;
receiving user input to navigate to a previous bookmark;
in response to receiving user input to navigate to a previous bookmark:
determining that the first bookmark location within the ERM both:
precedes the particular location within the ERM; and
is closer to the particular location within the ERM than any other bookmark location that precedes the particular location; and
causing the first portion of the ERM to be displayed in the graphical user interface.

12. The method of claim 11, further comprising:
causing a previous bookmark control element and a next bookmark control element to be displayed;
wherein user input to navigate to a previous bookmark is received via user selection of the previous bookmark control element.

13. The method of claim 6, further comprising:
receiving user instruction to navigate to a particular location, within the ERM, that is distinct from the first bookmark location;
wherein a particular portion of the ERM is located at the particular location within the ERM;
in response to receiving the user instruction to navigate to the particular location within the ERM:
displaying, in the graphical user interface, the particular portion of the ERM, and
displaying a current location indicator, in visual association with the content graphical element, at a particular position, along the content graphical element that corresponds to the particular location within the ERM;
receiving user input to navigate to a next bookmark;
in response to receiving user input to navigate to a next bookmark:
determining that the first bookmark location within the ERM both:
follows the particular location within the ERM; and
is closer to the particular location within the ERM than any other bookmark location that follows the particular location; and
causing the first portion of the ERM to be displayed in the graphical user interface.

14. One or more non-transitory computer readable storage media storing instructions which, when executed by one or more processors, cause:
causing content from a particular portion of a set of electronic reading material (ERM) to be displayed in a graphical user interface, wherein the particular portion is located at a particular location within the ERM;
wherein a plurality of user-designated bookmarks have been associated with respective bookmark locations within the ERM;
detecting a first invocation of a previous bookmark control element displayed in the graphical user interface;
in response to detecting the first invocation of the previous bookmark control element:
determining that a first user-designated bookmark, of the plurality of user-designated bookmarks, is associated with a first bookmark location within the ERM that:
precedes the particular location, and
is closer to the particular location than any other bookmark location that precedes the particular location;
causing content from a first portion of the ERM that is associated with the first bookmark location to be displayed;
while displaying content from the first portion of the ERM, detecting a second invocation of the same previous bookmark control element;
in response to detecting the second invocation of the previous bookmark control element:
determining that a second user-designated bookmark, of the plurality of user-designated bookmarks, is associated with a second bookmark location within the ERM that:
precedes the first bookmark location; and
is closer to the first bookmark location than any other bookmark location that precedes the first bookmark location; and
causing content from a second portion of the ERM that is associated with the second bookmark location to be displayed.

15. The one or more non-transitory computer readable storage media of claim 14, wherein the instructions further comprise instructions which, when executed by one or more processors, cause:
while displaying content from a certain portion of the ERM that is located at a certain location within the ERM, detecting a first invocation of a next bookmark control element displayed in the graphical user interface;

in response to detecting the first invocation of the next bookmark control element:

determining that a third user-designated bookmark, of the plurality of user-designated bookmarks, is associated with a third bookmark location within the ERM that:

follows the certain location, and is closer to the certain location than any other bookmark location that follows the certain location;

causing content from a third portion of the ERM that is associated with the third bookmark location to be displayed;

while displaying content from the third portion of the ERM, detecting a second invocation of the same next bookmark control element;

in response to detecting the second invocation of the next bookmark control element:

determining that a fourth user-designated bookmark, of the plurality of user-designated bookmarks, is associated with a fourth bookmark location within the ERM that:

follows the third bookmark location, and is closer to the third bookmark location than any other bookmark location that follows the third bookmark location; and causing content from a fourth portion of the ERM that is associated with the fourth bookmark location to be displayed.

16. The one or more non-transitory computer readable storage media of claim 15, wherein the instructions further comprise instructions which, when executed by one or more processors, cause:

while content from the particular portion of the ERM is being displayed in the graphical user interface:

causing an ERM content graphical element that represents the contents of the ERM to be displayed; and causing a current location indicator to be displayed on or within proximity of the ERM content graphical element, wherein the current location indicator is placed at a particular position along the ERM content graphical element that corresponds to the particular location within the ERM where the particular portion of the ERM is located;

in response to detecting the first invocation of the next bookmark control element:

causing the current location indicator to be moved to a certain position along the ERM content graphical element that corresponds to the third bookmark location within the ERM.

17. The one or more non-transitory computer readable storage media of claim 14, wherein the instructions further comprise instructions which, when executed by one or more processors, cause:

while content from the particular portion of the ERM is being displayed in the graphical user interface:

causing an ERM content graphical element that represents the contents of the ERM to be displayed; and causing a current location indicator to be displayed on or within proximity of the ERM content graphical element, wherein the current location indicator is placed at a particular position along the ERM content graphical element that corresponds to the particular location within the ERM where the particular portion of the ERM is located.

18. The one or more non-transitory computer readable storage media of claim 17, wherein the instructions further comprise instructions which, when executed by one or more processors, cause:

in response to detecting the first invocation of the previous bookmark control element:

causing the current location indicator to be moved to a certain position along the ERM content graphical element that corresponds to the first bookmark location within the ERM.

19. One or more non-transitory computer readable storage media storing instructions which, when executed by one or more processors, cause:

displaying, in a graphical user interface, a content graphical element that represents a set of electronic reading material (ERM);

wherein one or more user-designated bookmarks have been associated with respective bookmark locations within the ERM;

displaying, in the graphical user interface, and for each user-designated bookmark of the one or more user-designated bookmarks, a bookmark graphical element in visual association with the content graphical element;

wherein each bookmark graphical element is placed at a position, along the content graphical element, that corresponds to the bookmark location associated with the user-designated bookmark that corresponds to the bookmark graphical element;

detecting invocation of a first bookmark graphical element that is displayed at a first position along the content graphical element;

wherein the first bookmark graphical element corresponds to a first bookmark location within the ERM; and in response to detecting invocation of the first bookmark graphical element:

displaying, in the graphical user interface, a first portion of the ERM that is located at the first bookmark location.

20. The one or more non-transitory computer readable storage media of claim 19, wherein the instructions further comprise instructions which, when executed by one or more processors, cause:

while displaying the first portion of the ERM, causing a current location indicator to be displayed in visual association with the content graphical element;

wherein the current location indicator is placed at the first position along the content graphical element.

21. The one or more non-transitory computer readable storage media of claim 20, wherein:

the content from the ERM is caused to be displayed in a first portion of the graphical user interface; and the content graphical element, one or more bookmark graphical elements displayed in visual association with the content graphical element, and the current location indicator are caused to be displayed in a second portion, of the graphical user interface, that is separate from the first portion of the graphical user interface.

22. The one or more non-transitory computer readable storage media of claim 19, wherein the instructions further comprise instructions which, when executed by one or more processors, cause:

detecting invocation of a second bookmark graphical element that is displayed in visual association with the content graphical element;

wherein the second bookmark graphical element corresponds to a second bookmark location, within the ERM, that is distinct from the first bookmark location; and in response to detecting invocation of the second bookmark graphical element:

displaying, in the graphical user interface, a second portion of the ERM that is located at the second bookmark location.

23. The one or more non-transitory computer readable storage media of claim 19, wherein the instructions further comprise instructions which, when executed by one or more processors, cause:

detecting a user command to insert a second user-designated bookmark identifying a second portion of the ERM, wherein the second portion is located at a second bookmark location within the ERM that is different from the first bookmark location; and causing a second bookmark graphical element to be displayed in visual association with the content graphical element;

wherein the second bookmark graphical element is placed at a second position along the content graphical element that corresponds to the second bookmark location within the ERM;

wherein the second position is different from the first position.

24. The one or more non-transitory computer readable storage media of claim 19, wherein the instructions further comprise instructions which, when executed by one or more processors, cause:

receiving user instruction to navigate to a particular location, within the ERM, that is distinct from the first bookmark location;

wherein a particular portion of the ERM is located at the particular location within the ERM;

in response to receiving the user instruction to navigate to the particular location within the ERM:

displaying, in the graphical user interface, the particular portion of the ERM, and displaying a current location indicator, in visual association with the content graphical element, at a particular position, along the content graphical element, that corresponds to the particular location within the ERM;

receiving user input to navigate to a previous bookmark;

in response to receiving user input to navigate to a previous bookmark:

determining that the first bookmark location within the ERM both:

precedes the particular location within the ERM; and is closer to the particular location within the ERM than any other bookmark location that precedes the particular location; and causing the first portion of the ERM to be displayed in the graphical user interface.

25. The one or more non-transitory computer readable storage media of claim 24, wherein the instructions further comprise instructions which, when executed by one or more processors, cause:

causing a previous bookmark control element and a next bookmark control element to be displayed;

wherein user input to navigate to a previous bookmark is received via user selection of the previous bookmark control element.

26. The one or more non-transitory computer readable storage media of claim 19, wherein the instructions further comprise instructions which, when executed by one or more processors, cause:

receiving user instruction to navigate to a particular location, within the ERM, that is distinct from the first bookmark location;

wherein a particular portion of the ERM is located at the particular location within the ERM;

in response to receiving the user instruction to navigate to the particular location within the ERM:

displaying, in the graphical user interface, the particular portion of the ERM, and displaying a current location indicator, in visual association with the content graphical element, at a particular position, along the content graphical element, that corresponds to the particular location within the ERM;

receiving user input to navigate to a next bookmark;

in response to receiving user input to navigate to a next bookmark:

determining that the first bookmark location within the ERM both:

follows the particular location within the ERM; and is closer to the particular location within the ERM than any other bookmark location that follows the particular location; and causing the first portion of the ERM to be displayed in the graphical user interface.

\* \* \* \* \*